JACK E. BRIDGES
*INVENTOR.*
BY Francis W. Crotty
HIS ATTORNEY.

JACK E. BRIDGES
*INVENTOR.*
BY Francis W. Crotty
HIS ATTORNEY.

Feb. 11, 1958 J. E. BRIDGES 2,823,253

SUBSCRIPTION TELEVISION SYSTEM

Filed June 11, 1954 5 Sheets-Sheet 3

JACK E. BRIDGES
INVENTOR.
BY Francis W. Crotty
HIS ATTORNEY.

Feb. 11, 1958 J. E. BRIDGES 2,823,253

SUBSCRIPTION TELEVISION SYSTEM

Filed June 11, 1954 5 Sheets-Sheet 4

JACK E. BRIDGES
*INVENTOR.*

BY Francis W. Crotty

HIS ATTORNEY.

Feb. 11, 1958 J. E. BRIDGES 2,823,253

SUBSCRIPTION TELEVISION SYSTEM

Filed June 11, 1954 5 Sheets-Sheet 5

JACK E. BRIDGES
*INVENTOR.*

BY Francis W. Crotty

HIS ATTORNEY.

United States Patent Office 2,823,253

Patented Feb. 11, 1958

2,823,253

SUBSCRIPTION TELEVISION SYSTEM

Jack E. Bridges, Franklin Park, Ill., assignor to Zenith Radio Corporation, a corporation of Illinois Application June 11, 1954, Serial No. 436,121

18 Claims. (Cl. 178—5.1)

This invention relates to subscription television systems in which a television signal is transmitted in coded form to be utilized only in subscriber receivers having appropriate decoding apparatus actuated in accordance with the coding schedule employed at the transmitter. This application is a continuation-in-part of copending application Serial No. 326,107, filed December 15, 1952, in the name of Jack E. Bridges, and assigned to the present assignee.

Since the invention may be practiced in either a subscription television transmitter or receiver, the term "encoding" is used herein in its generic sense to encompass either coding at the transmitter or decoding at the receiver.

In the above-mentioned copending application, there is specifically described and claimed a subscription television system in which during each of a series of recurring mode-determining intervals a combination of code signal components, individually having a predetermined identifying characteristic such as frequency and collectively representing a code pattern, is developed at the transmitter. The code signal components, which are preferably randomly-sequenced and randomly-appearing within each combination, are segregated from one another in suitable filters for application over assigned input circuits to a transposition mechanism. The transposition mechanism selectively establishes a multiplicity of circuit connections between the input circuits and a plurality of output circuits, which are connected to various input circuits of a multi-stable actuating mechanism such as a bi-stable multivibrator. With this arrangement, the several code signal components may be applied to the input circuits of the actuating mechanism in accordance with a prescribed assignment or allocation to operate this mechanism from one to another of its stable operating conditions. As the mechanism is shifted between its several operating conditions, amplitude changes result and in response thereto the operating mode of the television system is likewise changed. In this manner the operating mode of the system is established for an interval introduced by each mode-determining interval and is determined by the particular code pattern of the combination of code signal components in that mode-determining interval.

At the same time, each combination of code signal components generated at the transmitter in mode-determining intervals is radiated to subscriber receivers along with the composite video signal. The code signal components are derived from the video signal at the receiver and by means of suitable filters are similarly segregated from one another for application, through a similar transposition mechanism, to various input circuits of a multi-stable actuating mechanism in exactly the same manner as at the transmitter. If the transposers are adjusted to the same setting, the actuator and decoder at the receiver operate in synchronism with the corresponding actuator and coder at the transmitter to effect intelligible image reproduction.

It is possible that the multi-stable actuating mechanisms at some of the subscriber receivers may fall out of step with the corresponding actuating mechanism at the transmitter, even though the transposition mechanisms are properly adjusted, due to overriding noise or other extraneous signal disturbances. To remedy this condition, reset pulses may be supplied to the actuating mechanism at the transmitter and at each corresponding mechanism at the various authorized receivers at the start of each mode-determining interval to restore all of the mechanisms to a predetermined reference operating condition for "locking in" or synchronizing the encoding equipment of the entire system, as described in detail in the above-identified copending application. With commensurate reset, or resetting at the commencement of each mode-determining interval, the actuators start off from the same condition at the beginning of each mode-determining interval regardless of the condition existing at the termination of each preceding mode-determining interval; in other words, the combination of code signal components occurring during each mode-determining interval is completely determinative of the operating mode assumed by the system at the termination of that interval. In accordance with the present invention, increased coding complexity is achieved by modifying the system in such a manner that the operating mode is determined not only by the combination of code-signal components occurring during a mode-determining interval, but also in part by the operating mode in which the system finds itself at the commencement of the mode-determining interval. In other words, in systems constructed in accordance with the invention, the past history of the encoding operation is a significant factor in determining the operating mode established by at least some of the code signal combinations; for convenience, operation in this manner is termed past history operation or past history encoding. In systems in which past history plays an essential role in the encoding process, it is virtually impossible for an unauthorized person to examine the various code combinations and their effects on the system in an attempt to decode or unscramble fraudulently the coded telecast inasmuch as recurring identical code signal components cannot be correlated with any particular operating condition.

In systems of the type in which the operating mode is varied periodically or in accordance with some fixed or repetitive plan during the operating intervals between successive mode-determining intervals, past history operation may be achieved with the present invention by resetting at regularly or irregularly spaced intervals recurring incommensurately with the mode-determining intervals. The average repetition rate at which resetting is accomplished may be equal to or higher or lower than that at which mode determinations are made; so long as there are some mode-determining intervals not accompanied by a resetting operation, past history operation is insured.

It is, accordingly, an object of the present invention to provide an improved encoding arrangement for a subscription television system of the general type described in the aforementioned copending application.

It is another object of the invention to provide an encoding arrangement having enhanced secrecy aspects for rendering unauthorized decoding extremely difficult.

It is a further object of the invention to provide a novel method of operating a subscription television system.

It is still another object of the invention to provide an encoding arrangement for achieving past history encoding.

It is an additional object of the invention to provide an improved subscription television transmitter employing past history coding.

It is a still further object of the invention to provide an improved subscription television receiver employing past history decoding.

An encoding arrangement for a subscription television system, constructed in accordance with the present invention, comprises an encoding apparatus having a plurality of operating conditions for establishing a corresponding plurality of operating modes in the television system. A control mechanism is coupled to the encoding apparatus and operates in response to an applied signal for selectively actuating the encoding apparatus between its operating conditions. Means is provided for developing during a first mode-determining interval a first combination of code signal components representing a predetermined first code pattern, and for developing during a second and succeeding mode-determining interval a second combination of code signal components representing a predetermined second code pattern. Finally, the encoding arrangement has means for utilizing the code signal components of the first combination to effect actuation of the control mechanism thereby to establish the encoding apparatus throughout an interval succeeding the first mode-determining interval in one of its operating conditions determined by the first code pattern, and for utilizing the code signal components of the second combination to effect actuation of the control mechanism for establishing the encoding apparatus throughout an interval succeeding both the first and second mode-determining intervals in one of its operating conditions conjointly determined by the first and second code patterns.

The features of this invention which are believed to be new are set forth with particularity in the appended claims. The invention, together with further objects and advantages thereof, may best be understood, however, by reference to the following description when taken in conjunction with the accompanying drawings, in which:

Figures 1 and 2 combined, with Figure 2 being placed immediately below Figure 1, constitute a schematic diagram of a subscription television transmitter constructed in the manner described in the aforementioned Bridges application;

Figure 1:
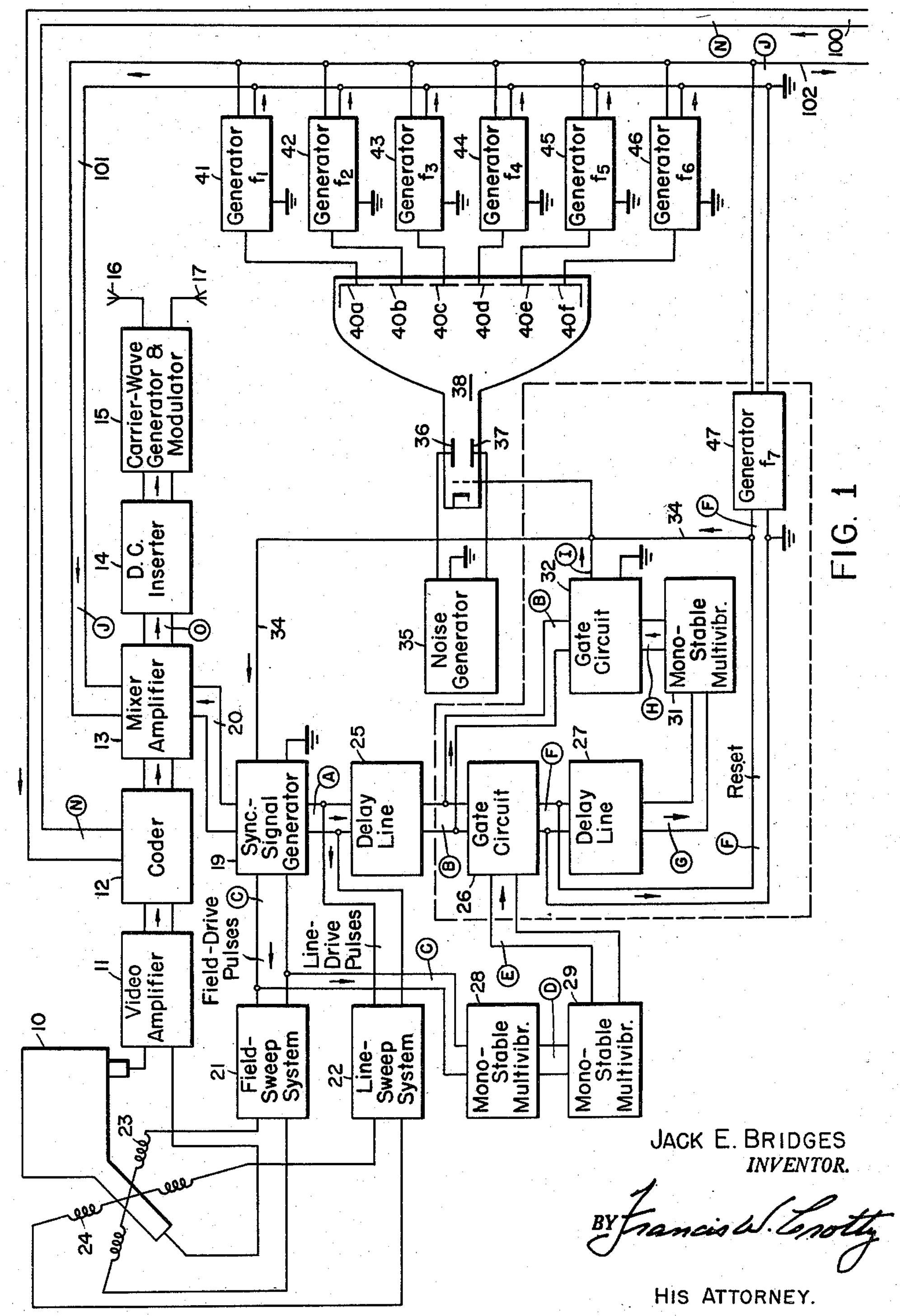
Figure 2:
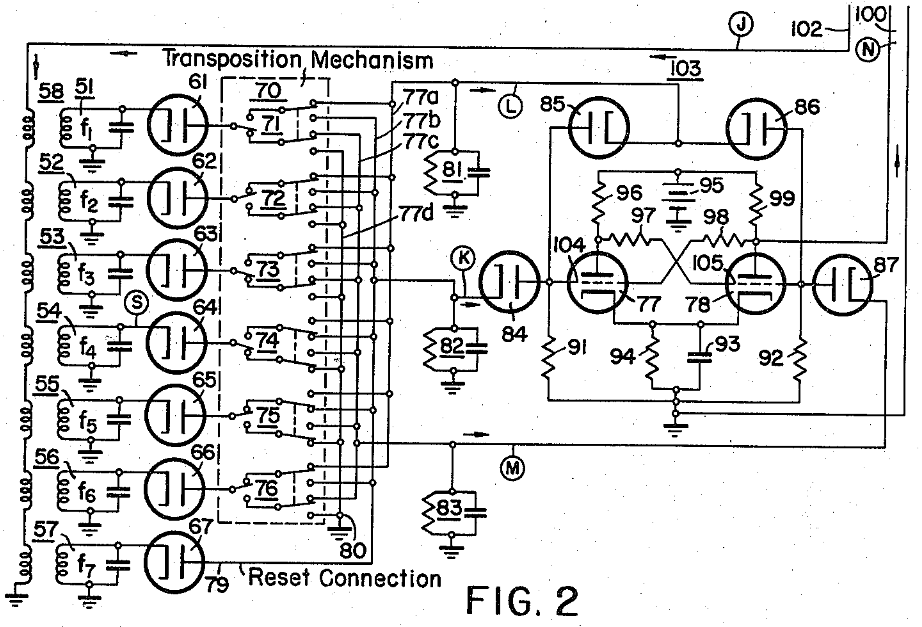
Figure 5:
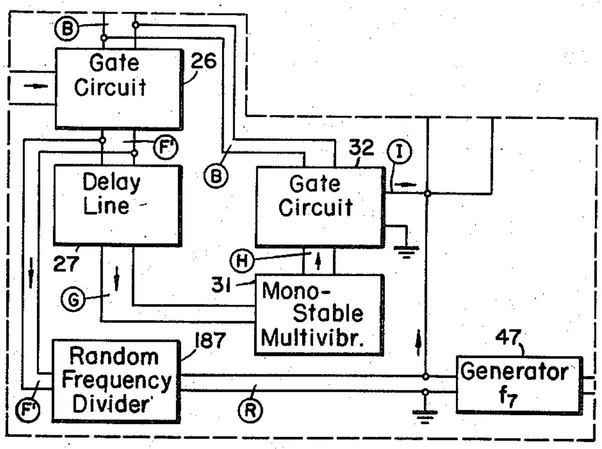
Figure 5 is a schematic representation of a component and the manner in which it may be incorporated into the transmitter of Figures 1 and 2 in order to provide a system that is constructed in accordance with one embodiment of the present invention.
Figure 6:
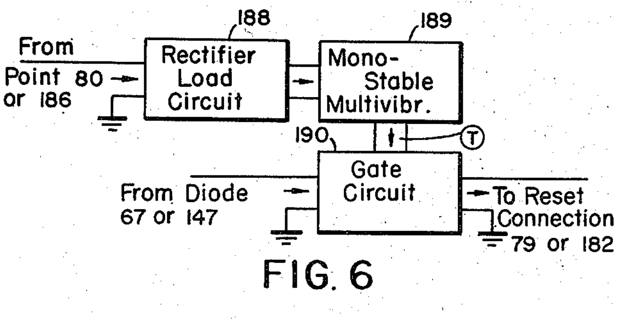
Figure 3:
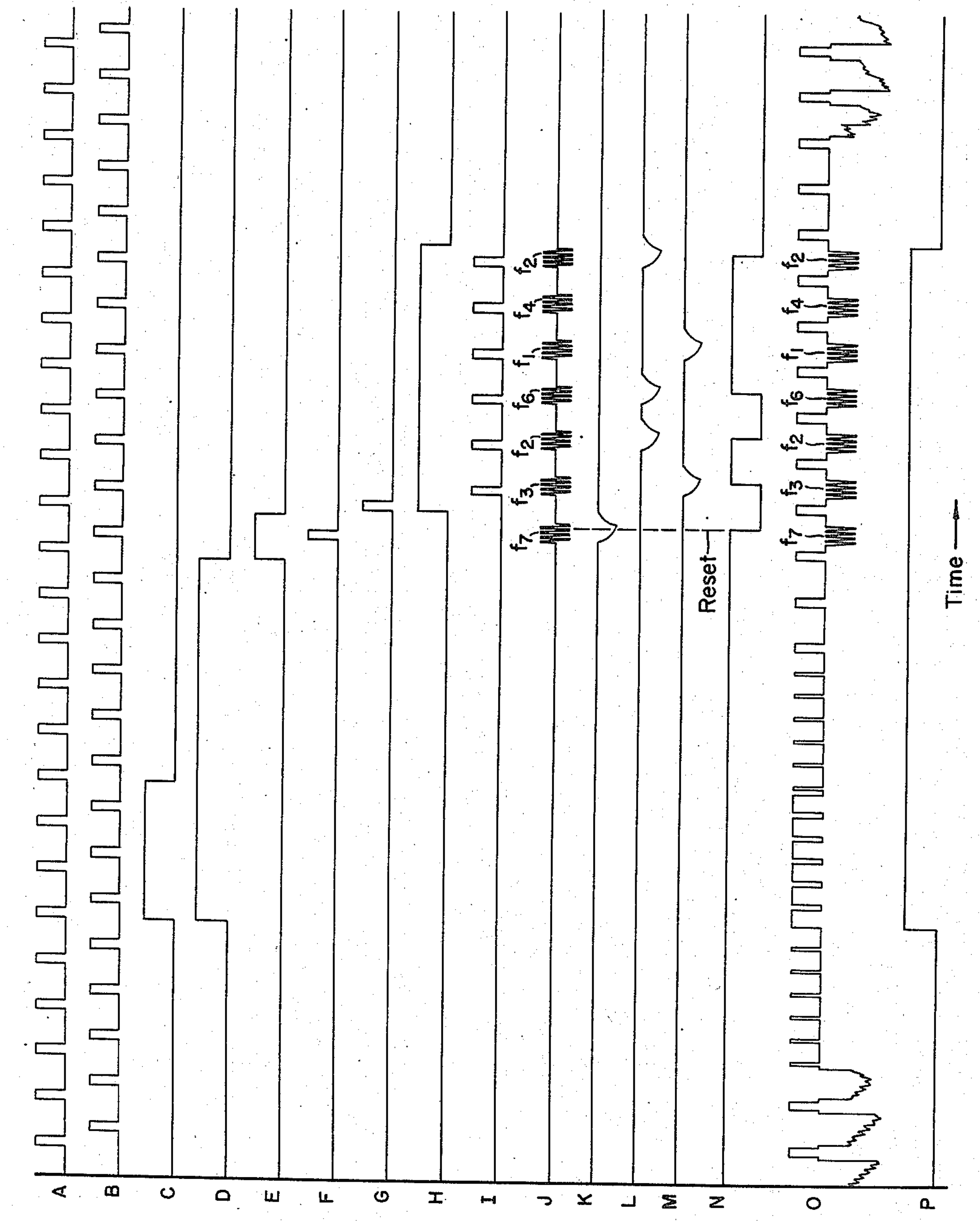
Figure 3 is a family of curves useful in explaining the operation of the transmitter of Figures 1 and 2.
Figure 4:
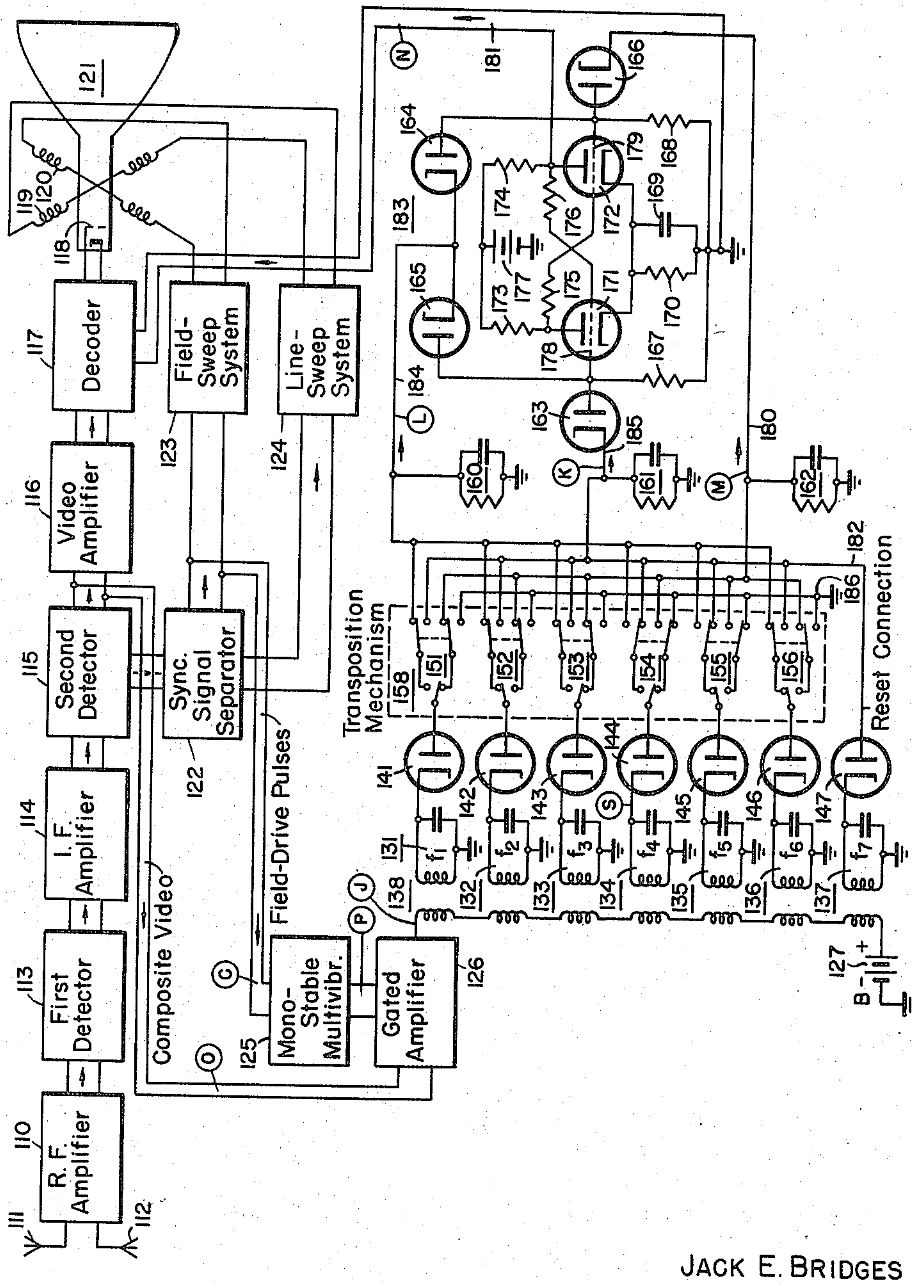
Figure 4 is a schematic diagram of a receiver for operation in conjunction with the transmitter of Figures 1 and 2.
Figure 7:
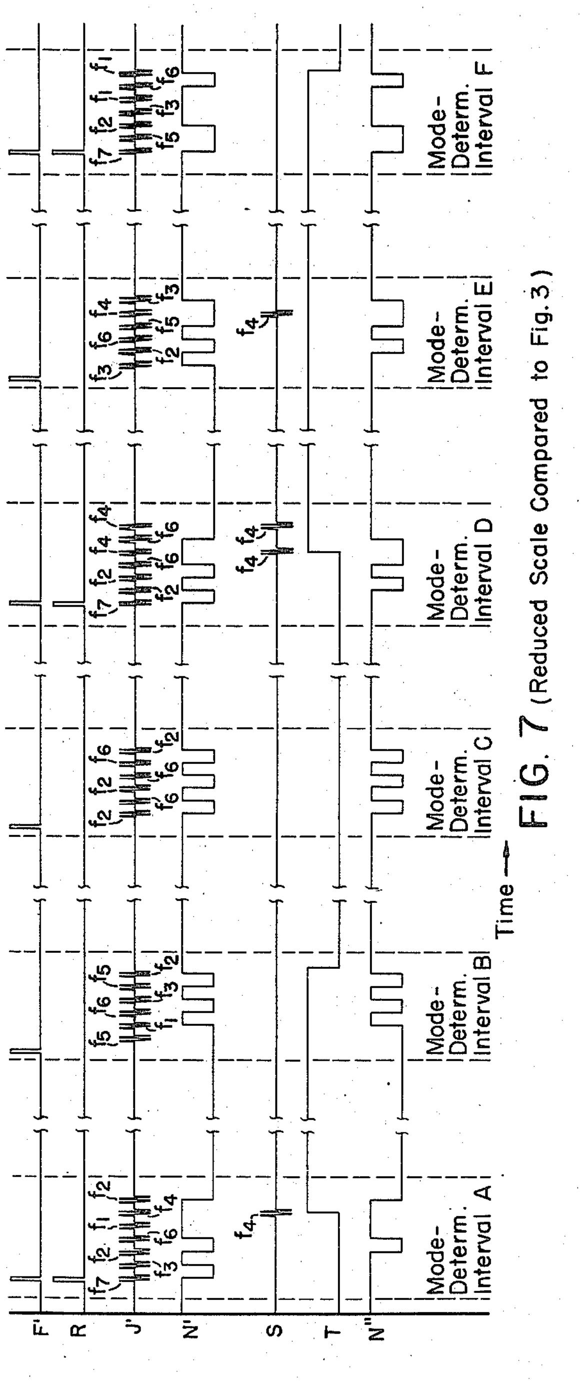
Figure 8:
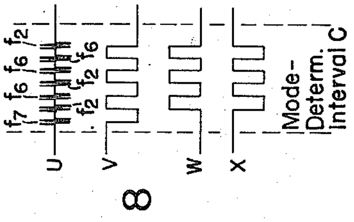

Figure 6 is a block diagram showing a group of components which may be incorporated into the transmitter of Figures 1 and 2 or in the receiver of Figure 4 to provide a system constructed in accordance with another embodiment of the invention; and Figures 7 and 8 show two series of waveforms helpful in explaining the operation of the circuits shown in Figures 5 and 6.

The transmitter of Figures 1 and 2 includes a picture-converting device 10 which may be an iconoscope, image orthicon or other well-known type. The output terminals of device 10 are connected through a video amplifier 11 and an encoding apparatus or coder 12 to the input terminals of a mixer amplifier 13. Coder 12 may be similar to that disclosed and claimed in a copending application of Robert Adler, Serial No. 243,039, filed August 22, 1951, and issued August 7, 1956, as Patent 2,758,153, entitled "Subscription Television System," and assigned to the present assignee. It may comprise a beam-deflection tube having a pair of output circuits which may be selectively coupled into the video channel as the electron beam thereof is deflected from one to the other of two segmental anodes coupled to such output circuits. One of these circuits includes a time-delay network so that the timing of the video components relative to the synchronizing components of the radiated signal varies as the beam of the deflection tube is switched between its anodes. This switching effect is accomplished by means of a beam-deflection control or actuating signal applied to encoding apparatus 12, as explained hereinafter. Such intermittent variations in the relative timing of the video and synchronizing components effectively codes the television signal since conventional television receivers, not equipped with suitable decoding apparatus, depend upon an invariable time relation between the video and synchronizing components of a received signal to provide intelligible image reproduction.

Viewed from the standpoint of operating modes, coder 12 has two stable operating conditions each of which imposes a different operating mode on the transmitter. In the first operating condition, coder 12 extends the video channel from amplifier 11 to mixer 13 without introducing any material delay, and in this condition the transmitter operation is conventional particularly in respect of the time relation between the video and synchronizing components of the radiated signal. In its second operating condition, coder 12 introduces a time delay in the video channel, and the transmitter then functions in an abnormal mode since the video and synchronizing components of the radiated signal have an abnormal time relation with respect to one another.

Mixer amplifier 13 is connected through a direct-current inserter 14 to a carrier-wave generator and modulator 15 which, in turn, is connected to an antenna 16, 17. The transmitter also includes a synchronizing-signal generator 19 which supplies line- and field-synchronizing components and associated pedestal components to mixer 13 over leads 20. Generator 19 further supplies field- and line-drive pulses to a field-sweep system 21 and to a line-sweep system 22, respectively. The output terminals of sweep systems 21 and 22 are connected to the field-deflection elements 23 and line-deflection elements 24, respectively, associated with picture-converting device 10.

Generator 19 additionally supplies field-drive pulses to a mono-stable multivibrator 28 to produce an elongated pulse of a predetermined duration in response to each applied field-drive pulse. The output terminals of multivibrator 28 are connected to a mono-stable multivibrator 29 which is actuated from its normal operating condition to its abnormal condition in response to the trailing edge of each output pulse from multivibrator 28 to develop an output pulse of a predetermined time duration. The output signal from multivibrator 29 is, in turn, applied as a gating signal to a normally-closed gate circuit 26.

Generator 19 also supplies line-drive pulses to a delay line 25 having output terminals connected to another input circuit of gate circuit 26 and further connected to an input circuit of another normally-closed gate circuit 32. The output terminals of gate circuit 26 are connected directly to a code burst generator 47, through a second delay line 27 to another mono-stable multivibrator 31, and over a conductor 34 to synchronizing-signal generator 19. The output terminals of multivibrator 31 are connected to the input terminals of gate circuit 32 to establish a gating signal therefor. The output signal of circuit 32 is also applied to synchronizing-signal generator 19 over conductor 34 and is supplied to a control grid of a beam-deflection device 38 to modulate the electron beam therein, energizing or "turning on" the beam for the duration of each applied signal pulse.

Beam-deflection device 38 includes a pair of deflection elements 36, 37 which are connected to the output terminals of a noise generator 35. This generator produces a signal having an instantaneous frequency that varies in random fashion over a suitable bandwidth and may vary in amplitude from one operating instant to the next. This signal, as applied to deflection electrodes 36, 37 establishes an alternating beam-deflection field within tube 38 having a peak-to-peak amplitude sufficient to sweep the beam (if it is energized) back and forth across a family of anode segments 40a—40f at a rate corresponding to the instantaneous frequency of the output signal of generator 35.

The load circuits for the several segmental anodes 40a—40f are completed through control circuits of a series of additional code burst generators 41—46, respectively. This coupling from the anode elements to the generators permits each generator to be turned on or energized by a current pulse resulting from the impingement of the beam in device 38 upon the associated anode segment. Each of the generators 41—47 includes a cycling or timing feature in the manner of a blocking oscillator or other mono-stable generator to determine the duration of the interval during which the generator is energized in order that the output obtained therefrom may have a selected duration, exceeding the current pulse delivered by its associated anode segment but less than the time separation of successive line-synchronizing pulses. Moreover, each of the generators 41—47 has a distinct, assigned operating frequency as indicated by the indicia $f_1$—$f_7$ to facilitate frequency selection or separation of the outputs from such generators.

The respective areas of the segmental anodes are preferably so chosen that each receives the same average current as the electron-beam is swept under the control of the signal applied to deflection elements 36, 37. The beam is thus directed to each of the anodes for an equal proportion of each program interval and has a substantially equal probability of impinging on any one of the six anodes each time the beam is gated on under the control of unit 32.

The beam-deflection device, the circuits provided for controlling the intensity and sweep of the electron beam of the device, and the generators coupled to the anode segments thereof, collectively constitute means for developing during each mode-determining interval a combination of code signal components individually having a predetermined identifying characteristic (frequency) and collectively representing a code pattern in accordance with their order within the combination. Their conjoint operation in that respect will be considered in more detail hereinafter. It is convenient to utilize frequency as the identifying characteristic of the output signals of generators 41—47 although other characteristics such as pulse width and amplitude are also suitable.

The output terminals of generators 41—47 are connected to a pair of input terminals of mixer amplifier 13 over conductors 101 and, by means of a ground connection and conductor 102, to the primary winding of a transformer 58 which may be sectionalized, as illustrated. Means responsive to the identifying characteristics of the encoding signal components are provided for separating these components from one another. This means includes a series of secondary windings of transformer 58 which constitute the inductive portions of a corresponding series of frequency-selective tuned circuits 51—57, each such circuit being resonant at a particular one of the frequencies $f_1$—$f_7$. The frequency-selective circuits, with the exception of circuit 57, are connected through diode rectifiers 61—66 to a transposition mechanism 70 while frequency-selective circuit 57 is connected through a diode rectifier 67 to a reset connection 79. The transposition mechanism 70 includes a series of switching devices 71—76, one for each of the selector circuits 51 to 56, respectively. Each such switching device comprises a first switch blade connected to the anode of the diode in circuit with its selector and adjustable to engage either of two contacts. Each of these contacts, in turn, is connected to second and third switch blades individually adjustable to engage either one of a further pair of terminals so that the circuit may be extended from the input terminal of the switching device to any one of four output terminals in accordance with the adjustment of the first, second and third switch blades. The second and third blades of each switching device are mechanically interconnected, as represented by the broken construction line, for unicontrolled action in respect of their contact pairs. Corresponding output terminals of the switching devices are interconnected by conductors 77a—77d. Conductors 77a—77d extend the circuits from the active output terminals of the switching devices to resistance-capacitance diode load circuits 81, 82, or 83 or, alternatively, to a ground connection 80.

The described circuitry of transposition mechanism 70 permits selective control of a control mechanism or multistable actuating device 103 provided for supplying a beam-deflection signal to coder 12 to effect actuation thereof and coding. As shown and as will be described presently, the actuating device has two stable operating conditions resulting from the use of a pair of electron-discharge devices 77 and 78 cross-coupled, one to the other, to be rendered conductive in alternation. If desired, a ring circuit may be used in the actuating device to provide a larger number of stable operating conditions and increase the flexibility as well as the capability of the coding technique. The use of a multi-stable actuator having a large number of stable operating conditions further reduces the number of frequency channels required for coding. Considering now more particularly the form of actuator represented, it comprises a pair of electron-discharge devices 77 and 78, the anode of device 77 being cross-coupled to the control electrode 105 of device 78 through a resistor 97 and the anode of device 78 being cross-coupled to the control electrode 104 of device 77 through a resistor 98. The anodes of devices 77 and 78 are connected through resistors 96 and 99, respectively, to a source of positive unidirectional operating potential 95, and the cathodes of the devices are connected in common through the parallel combination of a resistor 94 and a capacitor 93 to a ground connection.

The control mechanism or actuator has three input circuits for individually controlling the conductive condition of an assigned one of the discharge paths to determine the operating condition of the actuating device. One input circuit, coupled to the grid 104 and cathode of tube 77 to control the conductivity thereof, comprises a diode 84 connected between the high-potential terminal of network 82 and a resistor 91. A second input circuit for controlling the conductivity of tube 78 comprises a diode 87 and a resistor 92 coupled in similar fashion in respect of the high-potential terminal of network 83 and grid 105 of tube 78. The third input circuit extends from the high-potential terminal of network 81 through one diode 85 to grid 104 of tube 77 and, alternatively, through another diode 86 to grid 105 of tube 78. The anode of tube 78 is connected to coder 12 over conductors 100 to provide an actuating or deflection-control signal therefor having amplitude variations representing a coding schedule and determined by variations in the operating condition of actuator 103.

In order to restore actuating device 103 to a reference operating condition at predetermined times, reset connection 79 permanently connects frequency-selector 57 to the first-described input circuit of device 103 by way of conductor 77b.

In considering the operation of the described transmitter, the technique of coding will be disregarded initially. Picture-converting device 10 produces video-frequency components representing the program information to be televised and these components, after amplification in amplifier 11, are supplied through encoding apparatus or coder 12 to mixer amplifier 13. The mixer also receives the usual line- and field-synchronizing and blanking pulses from generator 19 so that a composite television signal is developed therein. That signal is adjusted as to background level in direct-current inserter 14 and is amplitude modulated on a picture carrier in unit 15. The modulated video carrier is supplied to antenna 16, 17 for transmission to subscriber receivers. It will, of course, be understood that in the generation of the video-frequency components sweep systems 21 and 22 are synchronized by the field- and line-drive pulses applied thereto by generator 19. As in any television broadcast, the accompanying audio information is modulated on a sound carrier and concurrently radiated. However, the sound system may be entirely conventional and since it constitutes no part of the instant invention, it has not been illustrated in order to avoid unnecessarily encumbering the drawing.

It is necessary in any commercial subscription system to code the video signal, and preferably the sound signal as well, to prevent pirating or unauthorized use of the program material. Briefly, coding of the video portion of the broadcast is accomplished by coder 12 under the influence of a deflection-control signal which switches the beam thereof back and forth between its two segmental anodes in accordance with a coding schedule represented by amplitude variations of that signal. As previously explained, this actuation of the coder varies the operating mode of the transmitter, modifies the time relation of the video and synchronizing components of the radiated signal, and achieves coding. Consideration will now be given to the particular manner in which the telecast is coded.

Periodically recurring line-drive pulses, shown in curve 3A, are supplied from generator 19 to delay line 25 to establish the pulses of curve 3B. This line is terminated in its characteristic impedance and exhibits a delay exceeding the duration of the line-drive pulses but substantially less than the time separation of such pulses. Simultaneously with the application of line-drive pulses to delay line 25, periodically recurring field-drive pulses, shown in curve 3C, are applied to multivibrator 28. The leading edge of an applied field-drive pulse actuates the multivibrator from its normal operating condition to an abnormal operating condition and the multivibrator automatically returns to its normal condition after a selected time interval determined by its internal cycling circuits to produce the pulse of curve 3D. The parameters of the multivibrator are so chosen that the trailing edge of this pulse occurs during the field-retrace time of the system, at a point following the equalizing pulses which succeed the serrated field pulse in present-day practice. This output signal is applied to mono-stable multivibrator 29 which responds to the trailing edge thereof and produces a gating pulse, shown in curve 3E. The parameters of multivibrator 29 are so chosen that this pulse overlaps, in point of time, one pulse from delay line 25. Gate circuit 26 receives the gating pulse as well as delayed line-drive pulses from delay line 25 and responds to their coincident effect to translate a pulse (curve 3F) to generator 47. This generator is energized by the applied pulse and develops a burst of signal of frequency $f_7$ having a time duration exceeding the duration of the actuating pulse but less than the time separation of successive line-synchronizing pulses. This signal burst of frequency $f_7$ produced at the output terminals of unit 47 is for reset purposes and is shown in curve 3J. The utility of this reset burst will be shown hereinafter.

The output signal from gate circuit 26 (curve 3F) is also delayed in delay line 27 which is terminated in its characteristic impedance and which exhibits such a delay that its output pulse, shown in curve 3G, follows the trailing edge of the pulse of curve 3F. The delayed output pulse is applied to mono-stable multivibrator 31, producing a gating pulse, shown in curve 3H for gate circuit 32. The parameters of multivibrator 31 are so chosen that its output pulse (curve 3H) overlaps, in point of time, the number of delayed line-drive pulses (curve 3B) to be employed in coding—six for the case in question. Delayed line-drive pulses are continuously supplied from delay line 25 to gate circuit 32 and those which occur within the duration of the gating pulse are translated to beam-deflection device 38. The translated pulses, shown in curve 3I, intensity modulate the beam, turning the beam on so to speak for the duration of each such pulse. At the same time, the variable amplitude sweep signal impressed on deflection elements 36, 37 by noise generator 35 creates a deflection field varying at a random rate to scan the beam back and forth across segmental anodes 40a—40f. Each time a pulse of curve 3I is applied to the control electrode, a pulse of current flows in the circuit of one of the segmental anodes to turn on the one of generators 41—46 that is coupled thereto. In the present illustration, for example, it will be assumed that when the first pulse of curve 3I occurs, the beam is directed to anode 40c and thus generator 43 produces a burst of signal of frequency $f_3$. It will further be assumed that as the succeeding pulses of curve 3I occur, generators 42, 46, 41, 44, and 42, are "turned on" in the recited order, producing corresponding bursts of signal of frequencies $f_2$, $f_6$, $f_1$, $f_4$, and $f_2$, as shown in curve 3J. A combination of code signal components of various frequencies is thus established, the components being randomly-sequenced and randomly-appearing within their combination.

These code signal components are impressed on the primary winding of transformer 58 and are selected by means of frequency-selectors 51—57. In other words, the first burst of signal of frequency $f_7$ is segregated by selector 57, the second burst of signal of frequency $f_3$ is segregated by selector 53, the third burst of signal of frequency $f_2$ is chosen by selector 52, and so on. Assuming that transposition mechanism 70 is adjusted as illustrated, selector 51 is coupled through diode 61 and switching element 71 to load circuit 83; selector 52 is coupled through diode 62 and switching element 72 to load circuit 81; selector 53 is coupled to load circuit 83; selector 54 is coupled to ground; selector 55 is coupled to load circuit 82 and selector 56 is coupled to load circuit 81. Thus, the reset pulse shown in curve K is developed in network 82 in response to the burst of signal frequency $f_7$; the pulses of curve L are developed in network 81 in response to the two bursts of signal frequency $f_2$ and the single burst of signal frequency $f_6$; and the pulses shown in curve M are developed in network 83 in response to the burst of signal frequency $f_3$ and the burst of signal frequency $f_1$. It will be noted that the burst of signal frequency $f_4$ is channeled directly to the ground and develops no signal potential in the load circuits.

It is thus seen that the transposition mechanism receives a particular combination of code signal components (curve 3J) and transposes that combination into a different effective combination (curves K, L and M) determined by the adjustmemnt of its switch elements 71 to 76 which direct the pulses of the first combination in respect of the input circuits of the control mechanism or bi-stable actuating device 103. In considering the transposition effected by mechanism 70 it will be manifest that the distribution of the coding pulses in respect of the input circuits of actuating device 103 is particularly significant in determining the final coding pattern. The specific setting of transposition mechanism 70 may be changed at will although it is convenient to adjust the mechanism at the start of a program and maintain it throughout the program. The switch setting information is disseminated only to subscriber receivers and a suitable charge may, of course, be assessed for such information.

Consider that in the first or reference operating condition of actuator 103, tube 77 is non-conductive and tube 78 is highly conductive; further consider that in the second or alternative operating condition, tube 77 is highly conductive and tube 78 is non-conductive.

In describing the effect of the transposed signal components upon actuator 103, it will be assumed initially that the actuator is in its second operating condition at the start of the mode-determining interval. The reset pulse of curve 3K which is received first is applied to control electrode 104 of device 77. The reset pulse biases device 77 to cut-off and the cross-coupling causes device 78 to be conductive, thus establishing the reference operating condition in the actuator. If actuating device 103 is in its reference condition at that time the reset pulse has no effect at all. In this manner, the actuator is certain to be in its reference condition at the beginning of each combination of coding signal pulses; the period for the combination is called a mode-determining interval inasmuch as the combination determines the particular mode of operation of the system for an ensuing operating interval, i. e., the succeeding field-trace interval in the particular illustration.

The next pulse, which is the first component of curve 3M, is applied from network 83 to control electrode 105 and causes device 78 to be driven beyond cut-off which, in turn, renders device 77 conductive. The actuator is thus triggered to its second operating condition. The next succeeding pulse of the coding combination which is the first pulse of curve 3L is impressed simultaneously on both control electrodes 104 and 105 from network 81. Device 78 being already non-conductive is not effected by the negative signal on its control electrode 105, whereas device 77 being in its conductive state is rendered non-conductive and device 78 then becomes conductive. The next succeeding pulse of the coding combination, which is the second component of curve 3L, is also applied from network 81 to control electrodes 104 and 105. The negative signal applied to control electrode 104 has no effect on device 77 whereas the signal impressed on control electrode 105 biases device 78 beyond cut-off which renders device 77 conductive. The actuator thus assumes its second operating condition. The next pulse of the transposed combination, which is the second component of the curve 3M, is applied from network 83 to control electrode 105 but has no effect since device 78 is already non-conductive. The next pulse of the original combination, a burst of signal of frequency $f_4$, is applied to ground through switch element 74 and does not reach actuator 103. The final pulse of the transposed combination is the last component of curve 3L and is applied from network 81 to control electrodes 104 and 105. It triggers the circuit to its first operating condition.

The resulting signal obtained from device 78 of bistable actuating device 103 (curve 3N) is applied to coder 12 over conductors 100 as a deflection-control signal. The amplitude excursions of this signal shift the beam of coder 12, and the amplitude level of the signal at the conclusion of the response of actuator 103 to the transposed code combination determines the operating mode of the system until the next succeeding mode-determining interval at which time the aforedescribed mode-determining process is repeated. In view of the random manner in which the frequency components may appear in the original combination (curve 3J), it is apparent that the mode-determining process causes the operating mode of the system to change from time to time in accordance with a random coding schedule. As a consequence, the transmission is coded.

In order that subscriber receivers may utilize the coded transmission, it is necessary that the combination of code signal components developed by beam-deflection device 38 and its associated circuitry be made known to such subscriber receivers. To that end, the code signal combination (curve 3J) is applied to mixer amplifier 13 at the same time it is delivered to transposer 70 to be combined with the composite video signal for transmission to subscriber receivers. The bursts of various signal frequencies, which constitute the code signal, occur between the line-drive pulses superimposed on the vertical-blanking pulse, and therefore it is desirable that the amplitude level of the blanking pulse be modified to effect an inward modulation of the blanking pulse by the coding signal components. To that end, the pulses shown in curves 3F and 3I are supplied to synchronizing-signal generator 19 over conductors 34 to produce suitable modulating pulses which, in turn, are supplied to mixer amplifier 13 over conductors 20 to downward modulate the vertical blanking pulse at the appropriate times. Inasmuch as the time duration of the modulating pulses should equal the duration of the signal bursts (curve 3J) and will therefore exceed the duration of the actuating pulses shown in curves 3I and 3F, signal generator 19 may include a timing device, such as a mono-stable multivibrator, to develop such modulating pulses of selected time duration in response to the actuating pulses. The effect of the application of these modulating pulses and the code signal components to the mixer amplifier 13 is readily apparent by observing the wave form of the radiated composite video signal shown in curve O.

It should be mentioned at this time that in the particular illustration the code signal components are produced during a portion of the vertical-retrace interval so that mode changes will be effected between field-trace intervals. However, it should be understood that the code signal may be developed and utilized at other times, for example during line-retrace intervals, if so desired.

The receiver of Figure 4, which may utilize the telecast originating at the transmitter of Figures 1 and 2, comprises a radio-frequency amplifier 110 having input terminals connected to an antenna circuit 111, 112 and output terminals connected to a first detector 113, the output terminals of the detector being connected to an intermediate-frequency amplifier 114. The output terminals of the intermediate-frequency amplifier are connected through a second detector 115 to a video amplifier 116 which, in turn, is coupled through an encoding apparatus or decoder 117 to the input electrodes 118 of a cathode-ray image-reproducing device 121. Decoder 117 may be similar to coder 12 at the transmitter except that it is controlled to operate in a complementary fashion in order effectively to compensate for the variations in the timing of the received television signal.

Second detector 115 is also coupled through a synchronizing-signal separator 122 to a field-sweep system 123 and a line-sweep system 124. The output terminals of sweep systems 123 and 124 are connected respectively to field-deflection elements 120 and line-deflection elements 119, associated with reproducing device 121.

Field-drive pulses derived from synchronizing-signal separator 122 are supplied to a mono-stable multivibrator 125 having output terminals connected to a normally-closed gated amplifier 126. The output terminals of second detector 115 are also connected to gated amplifier 126 to supply the composite video signal thereto, and the output circuit of this amplifier is completed through a sectionalized primary winding of a transformer 138 to a source of unidirectional operating potential 127. A series of secondary windings of the transformer constitute the inductive portions of a series of frequency-selective tuned circuits 131—137, individually resonant at a particular one of the seven frequencies employed in coding. Selectors 131 to 136 are connected via associated diode rectifiers 141—146 to a series of switching elements 151—156 while selector 137 is directly connected via a reset connection 182 to a parallel resistance-capacitance load circuit 161. Switching elements 151—156 constitute a transposition mechanism 158, similar to mechanism 70 of the transmitter, provided to connect any one of the selectors 131—136 to any one of three parallel resistance-capacitance load circuits 160, 161, 162 or to ground.

Load circuit 160 is connected via conductor 184 and a pair of isolating diodes 165, 164 to the control electrodes 178 and 179 of a pair of electron-discharge devices 171 and 172, respectively, of an actuator 183. These control electrodes are connected to ground through resistors 167 and 168, respectively. Load circuits 161 and 162 are connected to control electrodes 178, 179 of devices 171, 172, respectively, via conductors 185, 180 and isolating diodes 163 and 166. The anode of device 171 is cross-coupled to the control electrode 179 of device 172 through a resistor 175 and the anode of device 172 is cross-coupled to the control electrode 178 of device 171 through a resistor 176. The anodes of devices 171, 172 are also connected through resistors 173 and 174, respectively, to a source of unidirectional operating potential 177 and the cathodes of the devices are connected in common through the parallel combination of a resistor 170 and a capacitor 169 to a ground connection. The anode of device 172 is connected to decoder 117 over conductors 181 to provide an actuating or deflection-control signal therefor. The decoding arrangement shown in Figure 4, comprising the frequency-selective circuits, the transposition mechanism and the bi-stable actuating circuit is identical to the corresponding arrangement shown in Figure 2.

In operation, the coded television signal from the transmitter of Figures 1 and 2 is intercepted by antenna circuit 111, 112, amplified by radio-frequency amplifier 110 and heterodyned to the selected intermediate-frequency of the receiver in first detector 113. The resulting intermediate-frequency signal is amplified in intermediate-frequency amplifier 114 and detected in second detector 115 to produce a composite video signal. This latter signal is amplified in video amplifier 116 and impressed on the input electrodes 118 of image reproducing device 121 through decoder 117 to control the intensity of the cathode-ray beam of the device in well known manner.

The synchronizing components are separated in separator 122, the field-synchronizing components being utilized to synchronize sweep system 123 and, hence, the field scansion of image-reproducing device 121, whereas the line-synchronizing components are utilized to synchronize sweep system 124 and, therefore, the line scansion of device 121. Of course, the sound modulated carrier received along with the video carrier is translated in the usual way through an audio system which has been omitted from the drawings for purposes of simplicity.

Field-drive pulses from separator 122 are supplied to mono-stable multivibrator 125 to produce a gating pulse shown in curve 3P for normally-closed gated amplifier 126. The parameters of the multivibrator are so chosen as to overlap, in point of time, that portion of the field-retrace interval of the composite video signal (curve 3O) which includes the reset pulse and the other encoding signal pulses. The composite video signal is continuously applied to the input circuit of amplifier 126 but only the information contained during the interval of the gating pulse (curve 3P) is translated to the primary winding of transformer 138. Amplifier 126 is thus "open" during the times the signal bursts of various frequencies, representing the combination of code signal pulses, are received and consequently such bursts are separated out by the selector circuits 131—137 in the same manner as in the transmitter. When the various switching elements 151–156 of transposition mechanism 158 are adjusted to the same setting as transposition mechanism 70 at the transmitter, the input circuits of bi-stable actuating device 183 receive the identical pulses received by the corresponding input circuits of bi-stable actuating device 103 of the transmitter to produce an actuating or deflection-control signal for decoder 117 identical in wave form to curve 3N. Decoder 117 therefore operates in time coincidence with coder 12 at the transmitter so that the signal applied to electrodes 118 of image-reproducing device 121 is suitably compensated to effect proper image intelligibility.

The entire system of Figures 1–4 is reset to the same predetermined reference condition in preparation for each combination of code signal components. Consequently, the mode established at the termination of each mode-determining interval is determined solely by the particular combination of code signal components occurring during that interval. In systems constructed in accordance with the present invention, the past history of the encoding apparatus plays an essential role in the mode-determining operation; in other words, each specific combination of code signal components may effectuate different mode-determinations at different times, depending on the operating condition of the encoding apparatus at the commencement of the mode-determining interval. In a system employing a random variation of the code signal combinations from one mode-determining interval to the next, the operating mode at the commencement of a given mode-determining interval is dependent upon the previous code signal combination and its mode determination. Thus, the operating mode established at the termination of the mode-determining interval is determined conjointly by the code signal combination appearing within that interval and the combination of code signal components occurring within a previous mode-determining interval.

To accomplish "past history" operation of the system in accordance with the invention, the transmitter of Figures 1 and 2 may be modified to provide resetting of control mechanism 103 at the transmitter and corresponding control mechanism 183 at the receiver at intervals recurring incommensurately with the mode-determining intervals. This may be achieved by interposing a random-frequency divider 187 between gate circuit 26 on the one hand and $f_7$ generator 47 and conductor 34 on the other, in the manner indicated by substituting Figure 5 for the portion of Figure 1 designated in dashed outline. This random frequency divider may be constructed in the manner described in Patent 2,588,413, issued March 11, 1952, to Erwin M. Roschke, and assigned to the present assignee, such that the applied input pulses of curve F from gate circuit 26 (see particularly Figure 7 wherein this curve has been redrawn on a reduced time scale as waveform F′) are divided in a random fashion to produce the randomly-occurring pulses of curve R. These latter pulses are, in turn, applied to generator 47 to produce a corresponding series of randomly-occurring $f_7$ reset bursts.

Curve J has also been redrawn in Figure 7 on reduced scale as waveform J′ and a number of illustrative code combinations occurring in different and successive mode-determining intervals indicated A—F, specifically successive field-retrace intervals, have been added. It will be seen that inasmuch as only certain ones of the pulses of curve F′ are effectively translated by random frequency divider 187, reset bursts of frequency $f_7$ occur only at the beginning of mode-determining intervals A, D, and F.

As explained hereinbefore, the pulses of curve J′ are separated and, after rectification, are applied to the various input circuits of actuators 103 and 183 to produce identically shaped signals for effecting actuation of coder 12 and decoder 117. In accordance with the illustrative switch setting of the transposition mechanisms shown in Figures 2 and 4, the signal bursts of curve J′ are applied to the various input circuits of the control mechanisms 103 and 183 in such a manner that the signal shown in curve N′ in Figure 7 (redrawn from curve N) is produced in each mechanism for application to its associated encoding apparatus.

Examination of curve N′ reveals the beneficial results achieved by employing reset pulses that occur incommensurately with the mode-determining intervals, for example, reset pulses that appear less frequently than the mode-determining interval. During a mode-determining interval in which no reset pulse is present, the operating mode of the system for the period immediately succeeding that mode-determining interval is determined not only by the code pattern of the combination of code components occurring during that interval but also in part by the code pattern of the combination appearing during the preceding mode-determining interval.

If the system is not already established in its reference operating mode at the commencement of a mode-determining interval in which no $f_7$ reset burst is present, the code combination occurring during that interval may result in the establishment of the same or a different operating mode than in the case where a reset burst is present. To illustrate, the code components of curve J' occurring during mode-determining interval C have been shown, along with an $f_7$ reset burst, as curve U in Figure 8. Assume that each control mechanism 103, 183 is established in its non-reference operating condition before the arrival of the signal bursts of curve U, as indicated by the relatively positive potential level of curve V which would appear at the same point in each actuating circuit as curves N and N'. Each control mechanism is actuated in response to the $f_7$ reset pulse to its reference operating condition so that the signal of curve V undergoes a negative excursion as shown. Since the succeeding pulses occurring in mode-determining interval C (namely $f_2, f_6, f_2, f_6, f_6, f_2$) are applied to the input circuits of both tubes of each bi-stable multivibrator 103, 183, these multivibrators trigger back and forth between their operating conditions in response to each burst as shown in curve V, ending up at the termination of mode-determining interval C in the condition wherein the output signal is established at its negative potential level.

Assume now that the $f_7$ reset burst is not present in the combination illustrated in curve U, but assume further that each control mechanism is already established in its reference operating condition as shown by the relatively negative potential level at the beginning of curve W which represents the output signal of the multivibrators. In this case, the presence or absence of a reset pulse is of no consequence inasmuch as each control mechanism is already established in its reference condition. The control mechanisms are therefore actuated from the reference condition in response to the bursts $f_2, f_6, f_2, f_6, f_6, f_2$, to assume the same operating condition at the termination of interval C as in the case previously described in connection with curve V. This can very easily be seen by comparing curves W and V.

However, if the $f_7$ reset pulse is not present in the code signal combination of curve U and if the actuators are established in their non-reference condition at the commencement of the mode-determining interval as shown by the relatively positive potential of curve X which represents the signal appearing at the output terminals of control mechanisms 103 and 183, the first burst ($f_2$) triggers each multivibrator to its reference condition and the subsequent bursts ($f_6, f_2, f_6, f_6, f_2$) effect actuation back and forth, the multivibrators winding up at the termination of mode-determining interval C in the condition in which the output signal of curve X is established at its positive potential level rather than the negative level. In other words, the effect of the particular code signal combination on the encoding operation is dependent upon the operating mode of the system at the commencement of the mode-determining interval in which the code signal combination occurs.

In the foregoing discussion of the effect of omitting the $f_7$ reset burst, it has been convenient to consider a particular code signal combination composed entirely of components directed, through the rectifiers and the transposition switch, to the common input circuit of the encoder-actuating mechanism, so that each code signal burst results in a change in the operating condition of the actuating mechanism. In actual practice, however, the code signal bursts are randomly distributed in each combination. The rectified bursts which are channelled through the transposition mechanism to the individual input circuits of the encoder-actuating mechanism may, but do not necessarily, result in a change in the operating condition at a time when no such change would be effected with commensurate reset, or vice versa.

Thus, in the absence of a reset pulse preceding the combination of code signal components during any one particular mode-determining interval, the past history of the system has a very definite and positive effect on the operation. An interdependence between the various combinations of code signal components is present so that similar combinations may render different results. This feature further increases the coding complexity and makes it virtually impossible for an unauthorized person to examine various code signal combinations and their respective effects on the operation of the television system and arrive at the correct coding schedule by ordinary methods of cryptographic analysis.

As a further variant of the invention, Figure 6 illustrates circuitry that may be introduced into the receiver of Figure 4 as well as the transmitter of Figures 1 and 2 in order to additionally enhance the security aspects of the television system. Briefly, in this embodiment the reset pulses not only occur less frequently than the mode-determining intervals but are further coded so that only authorized receivers know exactly which reset pulses are to be used. This is achieved in the embodiment of Figure 6 by disconnecting point 80 at the transmitter from the ground connection and instead connecting this point to a rectifier load circuit 188. Since the switches of the transposition mechanism are so adjusted that the $f_4$ tuned circuit is connected to point 80 at the transmitter, the $f_4$ bursts will be channelled to load circuit 188. This load circuit is connected to the input terminals of a monostable multivibrator 189.

Consequently, each time an $f_4$ burst occurs in any of the various code signal combinations and is selected by means of tuned circuit 54 at the transmitter as shown in curve S, multivibrator 189 is triggered from its normal to its abnormal operating condition. The parameters of multivibrator 189 are so chosen that the output pulses, shown in curve T, produced in response to each applied pulse from load circuit 188, have a duration exceeding a field-trace interval and always overlap in point of time the position in which the $f_7$ reset burst occurs, if it does appear in the mode-determining interval immediately succeeding the interval exhibiting the $f_4$ burst.

The output terminals of multivibrator 189 are connected to one pair of input terminals of a normally-closed gate circuit 190 in order to provide a gating signal therefor, this gate having another pair of input terminals connected to the anode of diode 67 and ground. The output terminals of normally-closed gate circuit 190 are connected to ground and reset connection 79.

The circuitry of Figure 6 may also be included in the receiver of Figure 4 merely by disconnecting point 186 from ground and connecting it to load circuit 188, disconnecting the anode of diode 147 from reset connection 182 and connecting that anode to one input circuit of gate circuit 190, and also by connecting the output circuit of gate circuit 190 to reset connection 182. The manner of operation of the elements shown in Figure 6 is identical in transmitter and receiver.

With this arrangement, each $f_7$ reset pulse is supplied to gate circuit 190 and, depending on the condition of multivibrator 189, is either used or rendered ineffective. If an $f_4$ pulse appears in the mode-determining interval preceding that in which the $f_7$ reset pulse appears, a gating signal is applied to gate circuit 190 to permit that $f_7$ pulse to reset the control mechanism. On the other hand, if an $f_4$ pulse is not present in the preceding combination, the $f_7$ burst is not gated in or translated to the control mechanism.

Curve N' has been redrawn as N'' in Figure 7 to show the effect of disregarding certain reset pulses in accordance with a coding schedule known only to authorized subscribers. That is, unless a subscriber knows that the $f_4$ bursts are to be used to gate in any subsequent $f_7$ reset pulses, decoding is not possible. By examining curve N″ it will be seen that only the $f_7$ pulses that occur in time coincidence with a gating pulse of curve T are effective. Conversely, the reset pulse occurring at times not coincident with a gating pulse are ineffective. The difference in operation of the system when adapted in the manner shown in Figure 6 (curve N″) as compared to that previously described in connection with Figure 5 (curve N′) is readily apparent when the system is considered during, for example, mode-determining interval D. In that interval reset pulse $f_7$ is not used in the Figure 6 embodiment since no $f_4$ burst occurs in mode-determining interval C and consequently at the termination of mode-determining interval D the output signal from the control mechanism is established at its positive level (curve N″) whereas in the case of Figure 5 where $f_7$ burst is effective the output signal of the control mechanism is established at its negative level (curve N′).

With gated incommensurate reset in the manner described in connection with Figure 6, it is also possible to transmit reset pulses at the commencement of each mode-determining interval; in addition to permitting a simplification in transmitter equipment through the omission of random frequency divider 187, this type of operation renders the code schedule even less susceptible to unauthorized appropriation by imparting to the transmitted signal the appearance of one resulting from the use of commensurate reset.

The invention provides, therefore, a subscription television system in which increased security is achieved by virtue of the partial dependence of the encoding operation on the past history of the system.

Certain features described in the present application are disclosed and claimed in one or more of the following copending applications: Serial No. 35,698, filed June 28, 1948, in the name of Erwin M. Roschke et al., and issued October 20, 1953, as Patent 2,656,405; Serial No. 36,778, filed July 2, 1948, in the name of Richard O. Gray et al., and issued October 20, 1953, as Patent 2,656,406; Serial No. 94,643, filed May 21, 1949, in the name of Richard O. Gray et al., and issued October 20, 1953, as Patent 2,656,408; Serial No. 138,232, filed January 12, 1950, in the name of George V. Morris et al., and issued October 20, 1953, as Patent 2,656,409; Serial No. 245,178, filed September 5, 1951, in the name of George V. Morris et al., and issued October 20, 1953, as Patent 2,656,411; Serial No. 281,418, filed April 9, 1952, in the name of George V. Morris; Serial No. 291,714, filed June 4, 1952, in the name of Carl G. Eilers et al.; Serial No. 310,309, filed September 18, 1952, in the name of Alexander Ellett; Serial No. 366,727, filed July 8, 1953, in the name of Erwin M. Roschke; and Serial No. 370,174, filed July 24, 1953, in the name of Walter S. Druz, all of which are assigned to the present assignee.

While particular embodiments of the invention have been shown and described, modifications may be made, and it is intended in the appended claims to cover all such modifications as may fall within the true spirit and scope of the invention.

I claim:

1. An encoding arrangement for a subscription television system comprising: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first mode-determining interval a first combination of code signal components representing a predetermined first code pattern and during a second and succeeding mode-determining interval a second combination of code signal components representing a predetermined second code pattern; and means for utilizing said code signal components of said first combination to effect actuation of said control mechanism thereby to establish said encoding apparatus throughout an interval succeeding said first mode-determining interval in one of its operating conditions determined by said first code pattern, and for utilizing said code signal components of said second combination to effect actuation of said control mechanism for establishing said encoding apparatus throughout an interval succeeding both said first and second mode-determining intervals in one of its operating conditions conjointly determined by said first and second code patterns.

2. An encoding arrangement for a subscription television system comprising: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first mode-determining interval a first combination of code signal components individually having a predetermined identifying characteristic and collectively representing a predetermined first code pattern in accordance with their distribution within said first combination, and for developing during a second and succeeding mode-determining interval a second combination of code signal components individually having a predetermined identifying characteristic and collectively representing a predetermined second code pattern in accordance with their distribution within said second combination; and means for utilizing said code signal components of said first combination to effect actuation of said control mechanism thereby to establish said encoding apparatus throughout an interval succeeding said first mode-determining interval in one of its operating conditions determined by said first code pattern, and for utilizing said code signal components of said second combination to effect actuation of said control mechanism for establishing said encoding apparatus throughout an interval succeeding both said first and second mode-determining intervals in one of its operating conditions conjointly determined by said first and second code patterns.

3. An encoding arrangement for a subscription television system comprising: encoding apparatus having a plurality of operating conditions for establishing a corresponding plurality of operating modes in said television system; a multi-stable control mechanism coupled to said encoding apparatus having a plurality of operating conditions, at least some of which are effective to establish said encoding apparatus in assigned ones of its aforesaid operating conditions; at least three input circuits included in said control mechanism and individually responsive to an actuating signal to operate said control mechanism from one to another of its aforesaid operating conditions; means for developing during a first mode-determining interval a first combination of code signal components individually having a predetermined identifying characteristic and collectively representing a predetermined first code pattern in accordance with their order within said first combination, and for developing during a second and succeeding mode-determining interval a second combination of code signal components individually having a predetermined identifying characteristic and collectively representing a predetermined second code pattern in accordance with their order within said second combination; and means coupled to said last-mentioned means and to said input circuits for utilizing said code signal components of said first combination to apply actuating signals to said input circuits for effecting actuation of said control mechanism to establish said encoding apparatus throughout an interval succeeding said first mode-determining interval in one of its operating conditions determined by said first code pattern, and for utilizing said code signal components of said second combination to apply actuating signals to said input circuits for effecting actuation of said control mechanism to establish said encoding apparatus throughout an interval succeeding both said first and second mode-determining intervals in one of its operating conditions conjointly determined by said first and second code patterns.

4. An encoding arrangement for a subscription television system comprising: encoding apparatus having a plurality of operating conditions for establishing a corresponding plurality of operating modes in said television system; a multi-stable actuating mechanism for said encoding apparatus having at least two stable operating conditions and effectively including a plurality of electron-discharge paths cross-coupled, one to another, to render said paths conductive one at a time in a controlled sequence; at least three input circuits included in said actuating mechanism and individually responsive to an applied actuating signal for controlling the conductivity condition of an assigned one of said discharge paths to determine the operating condition of said actuating mechanism; means for developing during a first mode-determining interval a first combination of code signal components individually having a predetermined identifying frequency characteristic and collectively representing a predetermined first code pattern in accordance with their order within said first combination, and for developing during a second and succeeding mode-determining interval a second combination of code signal components individually having a predetermined identifying frequency characteristic and collectively representing a predetermined second code pattern in accordance with their order within said second combination; and means coupled to said last-mentioned means and to said input circuits for utilizing said code signal components of said first combination in a prescribed sequence to apply actuating signals to said input circuits for effecting actuation of said actuating mechanism thereby to establish said encoding apparatus throughout an interval succeeding said first mode-determining interval in one of its operating conditions determined by said first code-pattern, and for utilizing said code signal components of said second combination to apply actuating signals to said input circuits for effecting actuation of said actuating mechanism for establishing said encoding apparatus throughout an interval succeeding both said first and second mode-determining intervals in one of its operating conditions conjointly determined by said first and second code patterns.

5. In a subscription television system for translating a television signal including video-signal components in recurring trace intervals and synchronizing-signal components in intervening retrace intervals: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first one of said retrace intervals a first combination of code signal components representing a predetermined first code pattern and during a second and succeeding one of said retrace intervals a second combination of code signal components representing a predetermined second code pattern; and means for utilizing said code signal components of said first combination to effect actuation of said control mechanism thereby to establish said encoding apparatus throughout at least a portion of a trace interval succeeding said first retrace interval in one of its operating conditions determined by said first code pattern, and for utilizing said code signal components of said second combination to effect actuation of said control mechanism for establishing said encoding apparatus throughout at least a portion of a trace interval succeeding both said first and second retrace intervals in one of its operating conditions conjointly determined by said first and second code patterns.

6. In a subscription television system for translating a television signal including video-signal components in recurring field-trace intervals and synchronizing-signal components in intervening field-retrace intervals: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first one of said field-retrace intervals a first combination of code signal components representing a predetermined first code pattern and during a second and succeeding field-retrace interval a second combination of code signal components representing a predetermined second code pattern; and means for utilizing said code signal components of said first combination to effect actuation of said control mechanism thereby to establish said encoding apparatus throughout at least a portion of a field-trace interval immediately succeeding said first field-retrace interval in one of its operating conditions determined by said first code pattern, and for utilizing said code signal components of said second combination to effect actuation of said control mechanism for establishing said encoding apparatus throughout at least a portion of a field-trace interval immediately succeeding said second field-retrace interval in one of its operating conditions conjointly determined by said first and second code patterns.

7. In a subscription television system for translating a television signal including video-signal components in recurring field-trace intervals and synchronizing-signal components in intervening field-retrace intervals: encoding apparatus having a plurality of operating conditions for establishing a corresponding plurality of operating modes in said television system; a multi-stable actuating mechanism for said encoding apparatus having at least two stable operating conditions and effectively including a plurality of electron-discharge paths cross-coupled, one to another, to render said paths conductive one at a time in a controlled sequence; at least three input circuits included in said actuating mechanism and individually responsive to an applied actuating signal for controlling the conductivity condition of an assigned one of said discharge paths to determine the operating condition of said actuating mechanism; means for developing during a first one of said field-retrace intervals a first combination of code signal components individually having a predetermined identifying frequency characteristic and collectively representing a predetermined first code pattern in accordance with their order within said first combination, and for developing during a second and succeeding one of said field-retrace intervals a second combination of code signal components individually having a predetermined identifying frequency characteristic and collectively representing a predetermined second code pattern in accordance with their order within said second combination; and means coupled to said last-mentioned means and to said input circuits for utilizing said code signal components of said first combination in a prescribed sequence to apply actuating signals to said input circuits for effecting actuation of said actuating mechanism thereby to establish said encoding apparatus throughout a field-trace interval immediately succeeding said first field-retrace interval in one of its operating conditions determined by said first code pattern, and for utilizing said code signal components of said second combination in a prescribed sequence to apply actuating signals to said input circuits for effecting actuation of said actuating mechanism for establishing said encoding apparatus throughout a field-trace interval immediately succeeding said second field-retrace interval in one of its operating conditions conjointly determined by said first and second code patterns.

8. A coding arrangement for a subscription television transmitter comprising: coding apparatus having a plurality of operating conditions for establishing a corresponding plurality of operating modes in said television transmitter; a control mechanism coupled to said coding apparatus and responsive to an applied signal for selectively actuating said coding apparatus between its aforesaid operating conditions; means for developing during a first mode-determining interval a first combination of code signal components representing a predetermined first code pattern and during a second and succeeding mode-determining interval a second combination of code signal components representing a predetermined second code pattern; and means for utilizing said code signal components of said first combination to effect actuation of said control mechanism thereby to establish said coding apparatus throughout an interval succeeding said first mode-determining interval in one of its operating conditions determined by said first code pattern, and for utilizing said code signal components of said second combination to effect actuation of said control mechanism for establishing said coding apparatus throughout an interval succeeding both said first and second mode-determining intervals in one of its operating conditions conjointly determined by said first and second code patterns.

9. A coding arrangement for a subscription television transmitter comprising: coding apparatus having a plurality of operating conditions for establishing a corresponding plurality of operating modes in said television transmitter; a multi-stable actuating mechanism for said coding apparatus having at least two stable operating conditions and effectively including a plurality of electron-discharge paths cross-coupled, one to another, to render said paths conductive one at a time in a controlled sequence; at least three input circuits included in said actuating mechanism and individually responsive to an applied actuating signal for controlling the conductivity condition of an assigned one of said discharge paths to determine the operating condition of said actuating mechanism; means for developing during a first mode-determining interval a first combination of code signal components individually having a predetermined identifying frequency characteristic and collectively representing a predetermined first code pattern in accordance with their order within said first combination, and for developing during a second and succeeding mode-determining interval a second combination of code signal components individually having a predetermined identifying frequency characteristic and collectively representing a predetermined second code pattern in accordance with their order within said second combination; and means coupled to said last-mentioned means and to said input circuits for utilizing said code signal components of said first combination in a prescribed sequence to apply actuating signals to said input circuits for effecting actuation of said actuating mechanism thereby to establish said coding apparatus throughout an interval succeeding said first mode-determining interval in one of its operating conditions determined by said first code pattern, and for utilizing said code signal components of said second combination to apply actuating signals to said input circuits for effecting actuation of said actuating mechanism for establishing said coding apparatus throughout an interval succeeding both said first and second mode-determining intervals in one of its operating conditions conjointly determined by said first and second code patterns.

10. A decoding arrangement for a subscription television receiver comprising: decoding apparatus having a plurality of operating conditions for establishing a corresponding plurality of operating modes in said television receiver; a control mechanism coupled to said decoding apparatus and responsive to an applied signal for selectively actuating said decoding apparatus between its aforesaid operating conditions; means for developing during a first mode-determining interval a first combination of code signal components representing a predetermined first code pattern and during a second and succeeding mode-determining interval a second combination of code signal components representing a predetermined second code pattern; and means for utilizing said code signal components of said first combination to effect actuation of said control mechanism thereby to establish said decoding apparatus throughout an interval succeeding said first mode-determining interval in one of its operating conditions determined by said first code pattern, and for utilizing said code signal components of said second combination to effect actuation of said control mechanism for establishing said decoding apparatus throughout an interval succeeding both said first and second mode-determining intervals in one of its operating conditions conjointly determined by said first and second code patterns.

11. A decoding arrangement for a subscription television receiver comprising: decoding apparatus having a plurality of operating conditions for establishing a corresponding plurality of operating modes in said television receiver; a multi-stable actuating mechanism for said decoding apparatus having at least two stable operating conditions and effectively including a plurality of electron-discharge paths cross-coupled, one to another, to render said paths conductive one at a time in a controlled sequence; at least three input circuits included in said actuating mechanism and individually responsive to an applied actuating signal for controlling the conductivity condition of an assigned one of said discharge paths to determine the operating condition of said actuating mechanism; means for developing during a first mode-determining interval a first combination of code signal components individually having a predetermined identifying frequency characteristic and collectively representing a predetermined first code pattern in accordance with their order within said first combination, and for developing during a second and succeeding mode-determining interval a second combination of code signal components individually having a predetermined identifying frequency characteristic and collectively representing a predetermined second code pattern in accordance with their order within said second combination; and means coupled to said last-mentioned means and to said input circuits for utilizing said code signal components of said first combination in a prescribed sequence to apply actuating signals to said input circuits for effecting actuation of said actuating mechanism thereby to establish said decoding apparatus throughout an interval succeeding said first mode-determining interval in one of its operating conditions determined by said first code pattern, and for utilizing said code signal components of said second combination to apply actuating signals to said input circuits for effecting actuation of said actuating mechanism for establishing said decoding apparatus throughout an interval succeeding both said first and second mode-determining intervals in one of its operating conditions conjointly determined by said first and second code patterns.

12. A method of encoding a television signal comprising the steps of: developing during a first mode-determining interval a first combination of code signal components representing a predetermined first code pattern; utilizing said code signal components of said first combination to establish said television signal throughout an interval succeeding said first mode-determining interval in an operating mode determined by said first code pattern; developing during a second and succeeding mode-determining interval a second combination of code signal components representing a predetermined second code pattern; and utilizing said code signal components of said second combination to establish said television signal throughout an interval succeeding both said first and second mode-determining intervals in an operating mode conjointly determined by said first and second code patterns.

13. A method of encoding a television signal having video-signal components in recurring field-trace intervals and synchronizing-signal components in intervening field-retrace intervals, comprising the steps of: developing during a first one of said field-retrace intervals a first combination of code signal components individually having a predetermined identifying frequency characteristic and collectively representing a predetermined first code pattern in accordance with their order within said first combination; utilizing said code signal components of said first combination to establish said television signal throughout an interval succeeding said first field-retrace interval in an operating mode determined by said first pattern; developing during a second and succeeding one of said field-retrace intervals a second combination of code signal components individually having a predetermined identifying frequency characteristic and collectively representing a predetermined second code pattern in accordance with their order within said second combination; and utilizing said code signal components of said second combination to establish said television signal throughout an interval succeeding said second field-retrace interval in an operating mode conjointly determined by said first and second code patterns.

14. An encoding device for a subscription television system comprising: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during each of a series of recurring mode-determining intervals a combination of code signal components representing a code pattern; means for utilizing the code signal components developed during each of said mode-determining intervals to effect actuation of said control mechanism for establishing said encoding apparatus throughout a later interval in one of its operating conditions determined in part by the particular code pattern of such components; and means for resetting said control mechanism to establish said encoding apparatus in a predetermined reference condition at intervals recurring incommensurately with said mode-determining intervals, whereby the operating condition of said encoding apparatus is determined in accordance with the combined code patterns of more than one such combination of code signal components.

15. An encoding device for a subscription television system comprising: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during each of a series of periodically recurring mode-determining intervals a combination of code signal components individually having a predetermined identifying characteristic and collectively representing a predetermined code pattern; means for utilizing the code signal components developed during each of said mode-determining intervals to effect actuation of said control mechanism for establishing said encoding apparatus throughout a later interval in one of its operating conditions determined in part by the particular code pattern of such components; and means for resetting said control mechanism to establish said encoding apparatus in a predetermined reference condition at intervals recurring less frequently than said mode-determining intervals, whereby the operating condition of said encoding apparatus is determined in accordance with the combined code patterns of more than one such combination of code signal components.

16. In a subscription television system for translating a television signal including video-signal components in recurring field-trace intervals and synchronizing-signal components in intervening field-retrace intervals: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during each of at least some of said field-retrace intervals a combination of code signal components representing a code pattern; means for utilizing the code signal components developed during each of said last-mentioned field-retrace intervals to effect actuation of said control mechanism for establishing said encoding apparatus throughout a later interval in one of its operating conditions determined in part by the particular code pattern of such components; and means for resetting said control mechanism to establish said encoding apparatus in a predetermined reference condition at randomly-occurring intervals recurring less frequently than said last-mentioned field-retrace intervals, whereby the operating condition of said encoding apparatus is determined in accordance with the combined code patterns of more than one such combination of code signal components.

17. In a subscription television system for translating a television signal including video-signal components in recurring field-trace intervals and synchronizing-signal components in intervening field-retrace intervals: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during each of at least some of said field-retrace intervals a combination of code signal components representing a code pattern; means for utilizing the code signal components developed during each of said last-mentioned field-retrace intervals to effect actuation of said control mechanism for establishing said encoding apparatus throughout a later interval in one of its operating conditions determined in part by the particular code pattern of such components; a source of reset pulses; and means coupled to said source for resetting said control mechanism, including means for selecting only certain ones of said reset pulses, to establish said encoding apparatus in a predetermined reference condition at intervals recurring less frequently than said last-mentioned field-retrace intervals, whereby the operating condition of said encoding apparatus is determined in accordance with the combined code patterns of more than one such combination of code signal components.

18. A method of operating a subscription television system comprising the steps of: developing during each of a series of recurring mode-determining intervals a combination of code signal components representing a code pattern; utilizing the code signal components developed during each of said mode-determining intervals to establish said subscription television system throughout a later interval in an operating mode determined in part by the particular code pattern of such components; and resetting said television system to a predetermined reference operating mode at intervals recurring incommensurately with said mode-determining intervals, whereby the operating mode of said system is determined in accordance with the combined code patterns of more than one such combination of code signal components.

References Cited in the file of this patent

UNITED STATES PATENTS

| | | |
|---|---|---|
| 2,664,461 | Howland | Dec. 29, 1953 |
| 2,673,238 | Druz | Mar. 23, 1954 |
| 2,694,105 | Roschke | Nov. 9, 1954 |
| 2,697,741 | Roschke | Dec. 21, 1954 |